United States Patent
Schlemenat et al.

(10) Patent No.: US 6,833,433 B1
(45) Date of Patent: Dec. 21, 2004

(54) METHOD FOR PRODUCING ALIPHATIC OLIGOCARBONATE DIOLS

(75) Inventors: Andreas Schlemenat, Krefeld (DE); Jörg Tillack, Bergisch Gladbach (DE); Jörg Laue, Dormagen (DE); Herbert Witossek, Leipzig (DE)

(73) Assignee: Bayer Aktiengesellschaft, Leverkusen (DE)

( * ) Notice: Subject to any disclaimer, the term of this patent is extended or adjusted under 35 U.S.C. 154(b) by 71 days.

(21) Appl. No.: 10/297,542

(22) PCT Filed: May 25, 2001

(86) PCT No.: PCT/EP01/05966

§ 371 (c)(1),
(2), (4) Date: Dec. 4, 2002

(87) PCT Pub. No.: WO01/94444

PCT Pub. Date: Dec. 13, 2001

(30) Foreign Application Priority Data

Jun. 6, 2000 (DE) .......................................... 100 27 907

(51) Int. Cl.$^7$ .............................................. C08G 65/34
(52) U.S. Cl. ...................... 528/425; 528/480; 528/495; 528/488; 528/501; 528/503; 558/276; 558/265
(58) Field of Search ................................. 528/425, 480, 528/495, 488, 501, 503; 558/276, 265

(56) References Cited

U.S. PATENT DOCUMENTS

| | | | |
|---|---|---|---|
| 2,210,817 A | 8/1940 | Peterson | 260/2 |
| 2,787,632 A | 4/1957 | Stevens | 260/463 |
| 3,544,524 A | 12/1970 | Müller et al. | 260/77.5 |
| 3,631,200 A | 12/1971 | Nehring et al. | 260/463 |
| 4,105,641 A | 8/1978 | Buysch et al. | 526/712 |
| 4,463,141 A | 7/1984 | Robinson | 525/467 |
| 4,808,691 A | 2/1989 | König et al. | 528/76 |
| 5,100,999 A | 3/1992 | Murai et al. | 528/76 |
| 5,116,929 A | 5/1992 | Greco et al. | 528/44 |
| 5,171,830 A | 12/1992 | Grey | 528/371 |
| 5,478,962 A | 12/1995 | De Nardo et al. | 558/277 |
| 5,795,952 A | 8/1998 | Greco | 528/196 |
| 5,847,069 A | 12/1998 | Greco | 528/196 |

FOREIGN PATENT DOCUMENTS

| | | |
|---|---|---|
| DE | 857 948 | 12/1952 |
| GB | 1 263 225 | 2/1972 |
| GB | 1 476 268 | 6/1977 |

OTHER PUBLICATIONS

** Database WPI, Section Ch, Week 199102, Derwent Publications Ltd., London, GB: Class A23, AN 1991–011572 XP002182922 & JP 02 284918 A (Mitsui Petrochem. Ind Co Ltd), Nov. 22,1990 Zusammenfassung.

*Primary Examiner*—Duc Truong
(74) *Attorney, Agent, or Firm*—Joseph C. Gil; Aron Preis

(57) ABSTRACT

A process for the production of aliphatic oligocarbonate diols is disclosed. The optionally catalyzed high yield process entails the multistage transesterification of aliphatic diols with dimethyl carbonate. In the process DMC-methanol mixtures that have been distilled off are recycled to the reaction solution with further conversion and depletion of the contained DMC in the same or in a following reaction batch.

24 Claims, No Drawings

METHOD FOR PRODUCING ALIPHATIC OLIGOCARBONATE DIOLS

The present invention relates to a new process for the production of aliphatic oligo-carbonate diols from aliphatic diols by a multistage transesterification with dimethyl carbonate (DMC) with an almost complete consumption of the carbonate that is used. The process according to the invention enables a particularly high-yield production of aliphatic oligocarbonate diols to be achieved starting from easily accessible DMC.

Aliphatic oligocarbonate diols have been known for a long time as important intermediate products, for example in the production of plastics, lacquers and adhesives, for example by reaction with isocyanates, epoxides, (cyclic) esters, acids or acid anhydrides. They can be obtained in principle from aliphatic diols by reaction with phosgene (e.g. DE-A 1 595 446), bis-chlorocarbonic acid esters (e.g. DE-A 857 948), diaryl carbonates (e.g. DE-A 1 915 908), cyclic carbonates (e.g. DE-A 2 523 352: ethylene carbonate) or dialkyl carbonates (e.g. DE-A 2 555 805).

Of the carbonate sources, diphenyl carbonate (DPC) belonging to the diaryl carbonates is of particular importance since aliphatic oligocarbonate diols of particularly high quality can be produced from DPC (e.g. U.S. Pat. No. 3,544,524, EP-A 292 772). In contrast to for example aliphatic carbonate sources, DPC reacts quantitatively with aliphatic OH groups so that, after removal of the phenol that is formed, all terminal OH groups of the oligocarbonate diol are available for reaction with for example isocyanate groups. In addition only very small concentrations of soluble catalyst are required, with the result that the latter can remain in the product.

The processes based on DPC have the following disadvantages however:

Only ca. 13% of the DPC remains in the product, the remainder being distilled off as phenol. Depending on the respective alkyl radical, a substantially higher proportion of the dialkyl carbonates remains in the subsequent product. For example, ca. 31% of the dimethyl carbonate (DMC) remains in the subsequent product, since the methanol that is distilled off has a substantially lower molecular weight than phenol.

Accordingly, due to the fact that high boiling point phenol (normal boiling point: 182° C.) has to be separated from the reaction mixture, only diols having a boiling point that is considerably above 182° C. can be used in the reaction in order to avoid the diol being unintentionally distilled off.

Dialkyl carbonates, in particular dimethyl carbonate (DMC), as starting components are characterised by a better availability on account of their ease of production. For example, DMC can be obtained by direct synthesis from MeOH and CO (e.g. EP-A 0 534 454, DE-A 19 510 909).

Numerous patent applications (e.g. U.S. Pat. No. 2,210,817, U.S. Pat. No. 2,787,632, EP-A 364 052) relate to the reaction of dialkyl carbonates with aliphatic diols:

It is known from the state of the art to mix aliphatic diols together with a catalyst and the dialkyl carbonate (e.g. diethyl carbonate, diallyl carbonate, dibutyl carbonate) and distil off the alcohol that is formed (ethanol, butanol, allyl alcohol) from the reaction vessel through a column. The higher boiling point, co-evaporated dialkyl carbonate is separated in the column from the lower boiling point alcohol and is recycled to the reaction mixture.

In contrast to DPC, dialkyl carbonates do not react quantitatively with aliphatic OH groups since the transesterification of two aliphatic alcohols involves an equilibrium reaction. Thus, after the removal of the alcohol that is formed a proportion of the desired terminal OH groups are present not as OH groups but as alkoxycarbonyl terminal groups (—OC(O)—OR2 group in formula I, wherein R2 denotes an alkyl radical and R1 denotes an alkylene radical).

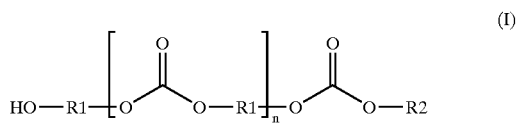

These alkoxycarbonyl terminal groups are unsuitable for further reaction with for example isocyanates, epoxides, (cyclic) esters, acids or acid anhydrides. The reaction is therefore completed by applying a vacuum in order to de-cap and remove the alcohol that is formed. The reaction mixtures are normally heated and stirred in vacuo in order to achieve this objective, although the quality of oligocarbonate diols that can be achieved is not as good as is obtained by reaction with DPC.

EP-A 0 364 052 describes for example a process in which a degree of utilisation of the terminal OH groups of only ca. 97% is achieved at 200° C. and under a vacuum of ca. 50 Torr (ca. 66 mbar). Even under considerably more drastic conditions the degrees of utilisation of the terminal OH groups can be increased only insignificantly. At 1 Torr (ca. 1.3 mbar) degrees of utilisation of only ca. 98% are achieved (EP-A 0 798 328).

The use of dimethyl carbonate (DMC) to produce aliphatic oligocarbonate diols has been known only for a fairly short time despite its good accessibility (e.g. U.S. Pat. No. 5 171 830, EP-A 798 327, EP-A 798 328, DE-A 198 29 593).

When using DMC to produce oligocarbonate diols low boiling point azeotropic DMC-methanol mixtures are formed that contain, depending on the pressure, ca. 20 to 30 wt. % of DMC (ca. 30 wt. % at normal pressure). A relatively large effort and expenditure is required to separate these azeotropic mixtures into methanol and DMC (e.g. membrane separation). The DMC that is azeotropically distilled off is accordingly lost to the reaction and is no longer available for a complete conversion. The lost DMC therefore has to be replenished by additional fresh DMC.

In EP-A 0 358 555 and U.S. Pat. No. 4,463,141 it is for example in addition simply recommended to take into account, during the weighing in, the amount of DMC that is azeotropically distilled off.

In EP-A 0 798 328 the corresponding diol component is reacted with DMC accompanied by distillation of the azeotropic mixture. The subsequent de-capping takes place under vacuum distillation, whereby under very drastic vacuum conditions (I Torr, ca. 1.3 mbar) degrees of utilisation of the terminal OH groups of ca. 98% can be achieved (EP-A 0 798 328: Table 1). No details of the remaining azeotropic mixture and the loss of the DMC are given.

EP-A 798 327 describes a two-stage process in which a diol is first of all reacted with an excess of DMC with distillation of the azeotropic mixture to form an oligocarbonate whose terminal OH groups are completely inaccessible, being methoxycarbonyl terminal groups. After removal of the catalyst and distillation of the excess DMC in vacuo (65 Torr, 86 mbar), the oligocarbonate diol is obtained in a second stage by adding further amounts of the diol and a solvent (e.g. toluene) as entrainment agent for the methanol that is formed. Solvent residues then have to be distilled off in vacuo (50 Torr, 67 mbar). The degree of utilisation of the terminal OH groups according to this process is only ca. 97%. The disadvantage of this process is that it is complicated due to the use of a solvent and due to the multiple distillation, low degree of utilisation of the terminal OH groups, as well as the very high DMC consumption.

In DE-A 198 29 593 a diol is reacted with DMC, the methanol that is formed being distilled off. This publication does not give any details of the overall azeotropic distillation procedure, apart from a single mention of the word "azeotrope" in the Table "Flow chart of the process according to the invention". Claim 1c states that the molar ratio of methanol to DMC in the distillate is between 0.5:1 and 99:1. The DMC content in the methanol that is distilled off is accordingly between 85 wt. % and 2.8 wt. %. As a detailed analysis shows (see below), in DE-A 198 29 593 DMC is in fact also used in excess and is distilled off azeotropically. Accordingly, ca. 27.8% of the DMC that is used is lost.

As Comparison Example 1 shows (see below), DMC contents in the distillate of less than 20% can be achieved only at high catalyst concentrations (ca. 0.15% Ti(O-iPr)$_4$, corresponding to ca. 250 ppm Ti) and very long reaction times. At these high catalyst concentrations the catalyst cannot be left in the product after the end of the reaction, but has to be neutralised. In DE-A 198 29 593 the catalyst (Example 1: 0.15% Ti(O-nBu)$_4$ and Example 2: 0.12% Ti(O-nBu)$_4$) is neutralised or masked by adding phosphoric acid.

The DMC content in the distillate increases with falling catalyst concentration (Comparison Example 1). Consistently low DMC contents in the distillate can be achieved only by drastically increasing the reaction time. With a reduced catalyst concentration of ca. 0.01% Ti(O-iPr)$_4$ (ca. 16 ppm Ti) the catalyst can remain in the product after the end of the reaction. As Comparison Example 1 shows, this leads however to industrially no longer practicable reaction times respectively DMC contents of 22 to 30% in the distillate.

In DE-A 198 29 593 no details are given concerning the degree of utilisation of the terminal OH groups.

In U.S. Pat. No. 5,171,830 butanediol-1,4 is first of all heated with DMC under reflux and then the volatile constituents are distilled off (azeotropically). After vacuum distillation under drastic conditions (1 Torr, 1.3 mbar), taking up the product in chloroform, precipitating the product with methanol and drying the product, an oligocarbonate diol is obtained in 55% of the theoretical yield (Example 6). No details are given concerning the degree of utilisation of the terminal OH groups and the azeotropic distillation procedure.

German Patent Application 1999 00 554.0 describes a process in which the transesterification of the diol with DMC is carried out by reactive rectification in a gas-liquid countercurrent apparatus. Due to the countercurrent procedure the methanol-DMC azeotropic mixture can be avoided and a DMC conversion of ca. 95% can be achieved. In order to de-cap the OH terminal groups nitrogen is passed through the product as stripping gas under a low vacuum (ca. 150 mbar) (2 to 200 Nl/h (Nl=normal liter)). By means of the stripping the methanol can be largely removed, the transesterification can be completed, and degrees of utilisation of the terminal OH groups of ca. 99.8% can be achieved.

None of the previously known publications describe industrially easily realisable processes for reacting DMC with aliphatic diols to form oligocarbonate diols with high space-time yields, almost complete conversion and with high degrees of utilisation of the terminal OH groups. The inevitable occurrence of DMC-methanol mixtures of varying composition and the associated loss of DMC considerably reduce the attractiveness of the described processes.

The object of the invention is accordingly to provide a simple, high-yield process that can also be carried out on an industrial scale, that enables oligocarbonate diols to be produced by transesterification of aliphatic diols with dimethyl carbonate, optionally with the use of such a small amount of catalyst that this can remain in the product after the end of the reaction, with good space-time yields, in simple apparatus, and with almost complete utilisation of the carbonate that is employed.

It has now surprisingly been found that the production of aliphatic oligocarbonate diols can be successfully achieved by reacting aliphatic diols with dimethyl carbonate, optionally accelerated by catalysts, with a degree of conversion of the DMC that is used of more than 80%, wherein in a multistage process DMC-methanol mixtures that have been distilled off are recycled to the reaction solution with further conversion and depletion of the contained DMC.

The present invention accordingly provides a process for the production of aliphatic oligocarbonate diols by reacting aliphatic diols with dimethyl carbonate, optionally accelerated by catalysts, with a degree of conversion of the DMC that is used of more than 80%, characterised in that in a multistage process DMC-methanol mixtures that have been distilled off are recycled to the reaction solution with further conversion and depletion of the contained DMC in the same or in a subsequent reaction batch.

In the execution of the process according to the invention for producing aliphatic oligocarbonate diols by reacting aliphatic diols with dimethyl carbonate, the mixture of DMC and MeOH that has been distilled off in a batch is re-used at the start of a following reaction batch. This DMC-methanol mixture that has been distilled off is thus re-used with further conversion of the contained DMC. Accordingly, the DMC of the previously collected and re-used mixture is depleted, and distillates are formed having reduced DMC contents.

The process according to the invention can be carried out as a two-stage or multi-stage process.

In order to achieve an almost complete conversion of the employed DMC in a multi-stage procedure, the process according to the invention is carried out as follows:

In a for example two-stage batch procedure the respective diol component is added to the vessel together with a catalyst in the first stage, and the (for example azeotrope) DMC-methanol mixture that has been formed and collected during a preceding batch process is added slowly thereto, preferably under the surface, for example through a dip tube. Depending on the feed rate, a distillate containing DMC in an amount of between 0.5 and 20%, preferably between 1.5 and 10%, and particularly preferably between 3 and 7%, is obtained at the head even of a short column.

In the second stage the residual amount of DMC, which results from the amount of DMC predetermined by the stoichiometry of the desired end product and the amount of DMC already added to the first stage of the reaction, is rapidly fed into the vessel and the DMC-methanol mixture thus distilled off over a large column (e.g. azeotropically) is collected.

The composition of all distillates is determined, and the loss of DMC that has occurred due to the distilling off of the DMC-methanol mixtures in the first and second stages is replenished in a subsequent stage by adding pure DMC. The distilled-off azeotrope consisting of DMC and MeOH is also collected and re-used in the first stage together with the distillate from the second stage in a subsequent reaction batch.

A de-capping of the terminal groups is necessary in order to achieve a degree of utilisation of the OH terminal groups of >99%.

In order to de-cap the terminal groups (utilisation of the terminal OH groups), the last residues of methanol and traces of dimethyl carbonate can be removed from the product. For example by passing in an inert gas (e.g. $N_2$) into the oligocarbonate diol, gas bubbles are generated in the product, optionally at an only slight vacuum of e.g. ca. 150 mbar, that in the product are saturated with methanol and/or DMC. The methanol is thus almost completely expelled from the reaction batch. By stripping with an inert gas the equilibrium can be displaced still further in favour of the product by the removal of the methanol, the esterification can be brought to completion, and thus the terminal groups can be utilised. The quality of the resultant oligocarbonate diol can thus be raised to the level of DPC-based oligocarbonate diols, and the degree of utilisation of the terminal OH groups rises to more than 98%, preferably to 99.0 to 99.95%, and particularly preferably to 99.5 to 99.9%.

The distillates with the low DMC contents can be discarded, used as solvents or wash liquids in other processes, converted by aqueous hydrolysis into methanol and used further or thermally exploited as such, or can also be used in the process according to the invention in a multistage procedure with further depletion of the DMC content.

In a three-stage variant of the process according to the invention for example these mixtures may be used as follows: a ca. 5% DMC-methanol mixture that has been collected in the second stage of the preceding reaction batch is used for example in a first stage. A further depletion of the DMC in the distillate to 0.3% to 5%, preferably to 0.8% to 4%, particularly preferably to 1.5% to 3%, is thereby achieved. These distillates are discarded or—as previously described—are utilised further. The DMC-methanol mixture containing for example ca. 30% DMC that was formed in the previous batch in the third stage is used in the second stage. A distillate containing for example ca. 5% DMC is then obtained in this case. This distillate is used in the first stage in the next batch. In the third stage pure DMC is added to the reactor, a DMC-methanol mixture containing for example 30% DMC again being formed, which is employed in the second stage of the following batch. The amount of DMC of the third stage is chosen so that the sum of the DMC amounts of all three stages after distilling off the DMC-methanol mixtures then corresponds to the amount predetermined by the desired stoichiometry. In the three-stage procedure it is therefore possible to achieve an almost quantitative utilisation of the employed DMC by recycling the distillate twice.

By appropriate repetition the process can also be carried out in more than three stages, and in fact up to n stages (where n is an integer greater than or equal to 2).

In principle a discontinuous batch procedure or a continuous procedure is possible according to the process of the invention. The batch procedure described above is only one example and should not be understood as restrictive. The person skilled in the art knows in principle how to carry out such processes in a fully continuous manner.

The addition of the DMC-methanol mixture and/or of the pure DMC can be effected in the process according to the invention also by repeated repumping of the distillate: distillates forming during the metering in procedure are returned to the pump vessel, where they are collected and reintroduced to the reactor. DMC-methanol mixture or pure DMC is thus continuously metered into the reactor from a pump vessel, a DMC-depleted mixture being distilled off and collected in the same vessel. The DMC concentration of the mixture in the vessel therefore constantly falls. In this connection the metering in rate is chosen to be higher by a multiple (e.g. ca 4 to 10 times higher) than in a simple metering in procedure. When the DMC content of the distillate has fallen to the desired value, the further addition of the DMC-methanol mixture or of the DMC to the reactor is stopped and the mixture is distilled further until the total amount of DMC and methanol has been distilled off and collected in the pump vessel.

Two vessels may also be employed when repumping the DMC-methanol mixtures or the DMC: a DMC-methanol mixture or pure DMC is passed from vessel 1 at a multiple rate (e.g. ca 4- to 10-fold rate) into the reactor and the distillate formed is collected in vessel 2. On account of the higher pumping rate this mixture does not reach the low DMC contents as previously, but instead is only somewhat depleted in DMC (for example ca. 10% to 28% depending on the catalyst concentration when using a ca. 32% DMC-methanol mixture Example 8). After all the DMC-methanol mixture or the DMC has been fed from vessel 1 into the reactor, the DMC-methanol collected in vessel 2 is passed, under the surface, into the reactor. The distillate that is now formed is collected in vessel 1. The change of vessels is repeated until the DMC content of the distillate has fallen below a desired value (for example ca. 3–5%). The distillates are thus fed under an in each case smaller depletion of the DMC, and thus more frequently, into the reactor.

In a further variant of the process according to the invention the last stage (for example the second stage in a two-stage process), in which pure DMC is rapidly metered in under distillation of the azeotropic mixture, is carried out in two partial stages: in the first partial stage the pure DMC is metered in sufficiently slowly so that not the azeotrope is distilled off, but instead a DMC-methanol mixture with for example ca. 5 to 8% DMC. This distillate is—like the distillate of the first stage—either discarded or, as described previously, used further. As Comparison Example 1 shows, the DMC content of the distillate increases with increasing reaction time on metering in the DMC. When a certain threshold value is exceeded, the remaining DMC is then added so quickly in the second partial stage that azeotropic DMC-methanol mixtures are distilled off. These mixtures are then collected and used further in a following reaction batch. The other stages in which DMC-methanol mixtures are introduced may likewise be carried out in several partial stages with different feed rates.

The process according to the invention (reaction and distillation under the addition of DMC-methanol mixtures or DMC) is in principle carried out under a light vacuum, under normal pressure, or at elevated pressure. The reaction is preferably carried out a pressure of 0.4 to 100 bar, preferably 0.7 to 15 bar, particularly preferably at a pressure of 1 to 6 bar and—depending on the respective pressure—at temperatures of 100 to 300° C., preferably at temperatures of 160 to 240° C. In this connection an elevated pressure leads, on account of the better azeotropic point (e.g. ca. 20% DMC/80% MeOH at 4 bar) to a better conversion of DMC and thus shorter reaction times, and also to lower DMC contents in the distillate.

The DMC content of the distillate when using a DMC-methanol mixture or pure DMC depends in each case on the feed rate and reaction time, and on the amount of catalyst: an increase in the catalyst concentration and/or a reduction in the feed rate of the DMC-methanol mixture or of the DMC (increase in the reaction time) leads to a reduction of the DMC content in the distillate. A lowering of the catalyst concentration and/or a reduction in the reaction time results in a higher DMC content in the distillate.

The amount of DMC that has been removed from the reaction batch by distillation is determined by measuring the DMC contents of the individual distillates. This missing amount must be added in the form of pure DMC to the batch before stripping the methanol with inert gases under a vacuum in order to utilise the terminal groups. A mixture of DMC and methanol is again formed. This lost DMC is replenished, a proportion being distilled off again. With each new addition the amount of DMC distilled off becomes less, and accordingly the desired stoichiometry is approached (Example 2). This complicated procedure can be simplified considerably by combining the individual subsequent stages: the amounts of DMC that are distilled off in the individual subsequent stages are known or may be calculated beforehand from previous batches—for example in the first batch—so that the complete amount of DMC can be added in a single stage (Example 3, composition of the second stage and subsequent stages).

A small amount of DMC is lost when inert gas bubbles are pumped in during the distillation of the methanol and the de-capping of the OH terminal groups at the end of the reaction. This amount must be taken into account beforehand in the addition of DMC. This amount may be determined from the empirical values of the previous batches.

Alternatively, a small excess of DMC may be added beforehand so that, after the distilling off of the azeotrope and after the de-capping by stripping of the last residues of methanol and DMC by passing in an inert gas (e.g. $N_2$) under a slight vacuum (ca. 150 mbar), a slight excess of DMC remains in the product or is bound as ester. After the stripping a product is thus obtained that exhibits a complete functionality of the terminal OH groups but in which the degree of polymerisation is too high. The correction is then made by adding a further amount of the diol component and carrying out a new, short esterification stage (Example 4). The correction amount may be determined on the one hand via the mass balance—determination of the DMC amounts in all distillates and comparison with the total amount added—or may be determined from a measurable property (e.g. OH number, viscosity, average molecular weight, etc.) of the product whose degree of polymerisation is too high. A renewed de-capping is not necessary after the correction since all terminal OH groups were already free before the correction and no renewed capping is caused by adding the diol components.

A correction by adding DMC after the de-capping by gassing with an inert gas in the case of a product containing too little DMC leads to a renewed build-up of the capping.

The process according to the invention thus comprises the following process stages in the two-stage variant:
addition of the diol components and optionally the catalyst to the reactor,
$1^{st}$ stage: introduction of the DMC-methanol mixture (for example the azeotrope) from the previous batch and reaction of the DMC contained therein, distilling off of a DMC-methanol mixture with—depending on the reaction conditions—for example 3 to 7% of DMC, or if desired multiple pumping of the distillate until the DMC content has fallen to the desired value,
$2^{nd}$ stage: introduction and reaction of pure DMC. The amount of DMC is chosen so that, after distilling off, exactly the required amount of DMC or alternatively a slight excess remains in the reaction solution in all stages (addition of the DMC-methanol mixture (e.g. azeotrope), addition of DMC and de-capping). If desired the complete amount of DMC may be metered in rapidly in one stage or in two partial stages: in the first case a DMC-methanol mixture (e.g. the azeotrope) is distilled off, collected, and re-used in the first stage in a following batch. In the second case the DMC is metered in sufficiently slowly in the fist partial stage that DMC-methanol mixtures with low DMC contents are obtained, and in the second partial stage—after an increase of the DMC content in the distillate—the DMC is then rapidly metered in so that a DMC-methanol mixture having a higher DMC content (e.g. the azeotrope) is formed, which is re-used in a following batch, optional de-capping: utilisation of the terminal OH groups by discharging the last methanol and/or DMC residues, for example by generating gas bubbles (for example introduction of inert gases such as $N_2$), for example under a slight vacuum (e.g. ca. 150 mbar), optional correction: correction of the stoichiometry by adding further amounts of the diol components and renewed brief esterification.

In the first batch, in which no DMC-methanol mixtures are yet available from the previous batches, in principle only pure DMC may be used, with the result that on distillation only a DMC-methanol mixture (e.g. the azeotrope) is formed that is re-used in the first stage in the second batch, or if desired a DMC-methanol mixture (e.g. the azeotrope) is prepared by mixing DMC and methanol in the expected amounts.

Aliphatic diols with 3 to 20 C atoms in the chain are used in the process according to the invention. The following compounds may be mentioned by way of example, although this is not a complete list: 1,7-heptanediol, 1,8-ocatanediol, 1,6-hexanediol, 1,5-pentanediol, 1,4-butanediol, 1,3-butanediol, 1,3-propanediol, 2-methyl-1,3-propanediol, 3-methyl-1,5-pentanediol, 2-methyl-pentanediol, 2,2,4-trimethyl-1,6-hexanediol, 0.3,3,5-trimethyl-1,6-hexanediol. 2,3,5-trimethyl-1,6-hexanediol, cyclo-hexanedimethanol, etc. as well as mixtures of various diols.

Furthermore the addition products of the diols with lactones (ester diols) such as for example caprolactone, valerolactone, etc., may be used as well as mixtures of the diols with lactones, an initial esterification of lactone and the diols not being necessary.

Moreover there may be used the addition products of the diols with dicarboxylic acids, such as for example: adipic acid, glutaric acid, succinic acid, malonic acid, etc. or esters of dicarboxylic acids as well as mixtures of diols and dicarboxylic acids or esters of dicarboxylic acids, a preliminary transesterification or dicarboxylic acid and diols not being necessary.

Polyether polyols may furthermore be used, such as for example polyethylene glycol, polypropylene glycol, polybutylene glycol as well as polyether polyols that have been obtained by copolymerisation of for example ethylene oxide and propylene oxide, or polytetramethylene glycol that has been obtained by ring-opening polymerisation of tetrahydrofuran (TBF).

Mixtures of various diols, lactones and dicarboxylic acids may be used.

1,6-hexanediol, 1,5-pentanediol and mixtures of 1,6-hexanediol and caprolactone are preferably used in the process according to the invention.

As catalysts there may in principle be used all soluble catalysts known for transesterification reactions (homogeneous catalysis), as well as heterogeneous transesterification catalysts. The process according to the invention is preferably carried out in the presence of a catalyst.

Particularly suitable for the process according to the invention are hydroxides, oxides, metal alcoholates, carbonates and organometallic compounds of metals of main groups I, II, III and IV of the Periodic System of the Elements, of subgroups III and IV, as well as the elements of the rare earth group, in particular compounds of Ti, Zr, Pb, Sn and Sb.

The following may be mentioned by way of example: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octanoates, dibutyltin dilaureate, dibutyltin oxide, dibutyltin methoxide, bistributyltin oxide, tin oxalates, lead stearates, antimony trioxide, zirconium tetra-iso-propylate, etc. Inorganic or organic acids may furthermore be used as catalysts, for example phosphoric acid, acetic acid, p-toluenesulfonic acid.

There may furthermore be used in the process according to the invention tertiary amines $R_1R_2R_3N$ where $R_{1-3}$ denotes $C_1-C_{30}$-hydroxyalkyl, -aryl or -alkyl, in particular trimethylamine, triethylamine, tributylamine, N,N-dimethylcyclohexylamine, N,N-dimethylethanolamine, 1,8-diazabicyclo-(5.4.0)undec-7-en, 1,4-diazabicyclo-(2.2.2)-octane, 1,2-bis(N,N-dimethylamino)ethane, 1,3-bis(N,N-dimethylamino)propane and pyridine.

Preferably the alcoholates and hydroxides of sodium and potassium (NaOH, KOH, KOMe, NaOMe), the alcoholates of titanium, tin or zirconium (e.g. $Ti(OPr)_4$), as well as organotin compounds are used, the titanium, tin and zirconium tetra-alcoholates preferably being used with diols that contain ester functions or mixtures of diols with lactones.

In the process according to the invention the homogeneous catalyst is optionally used in concentration (specified in weight percent of metal referred to aliphatic diol that is used) of up to 1000 ppm (0.1%), preferably between 1 ppm and 500 ppm, particularly preferably 5 to 100 ppm. The catalyst may be left in the product after the end of the reaction or may be separated, neutralised or masked. The catalyst is preferably left in the product.

The removal of the methanol for the de-capping of the terminal groups may take place for example by heating the reaction mixture in vacuo, preferably by producing gas bubbles in the apparatus. These gas bubbles may be generated by passing inert gases such as nitrogen, argon, methane, ethane, propane, butane, dimethyl ether, dry natural gas or dry hydrogen into the reactor, wherein the methanol-containing and dimethyl carbonate-containing gas stream leaving the oligocarbonate may be added again to the oligocarbonate for the saturation.

These gas bubbles may also be produced by passing in inert, low boiling point liquids such as pentane, cyclopentane, hexane, cyclohexane, petroleum ether, diethyl ether or methyl-tert.-butyl ether, wherein the substances may be passed in in liquid or gaseous form and the methanol-containing and dimethyl carbonate-containing gas stream leaving the oligocarbonate may be partially added again to the oligocarbonate for the saturation. Preferably nitrogen is used.

The substances used to produce gas bubbles may be added to the oligocarbonate through simple dipping tubes, preferably by means of annular nozzles or gassing stirrers. The degree of utilisation of the terminal OH groups that is achieved depends on the duration of the de-capping, and on the amount, size and distribution of the gas bubbles: with increasing duration of the de-capping and better distribution (for example better distribution and larger interface due to larger numbers of smaller gas bubbles when the latter are introduced through a gassing stirrer), the degree of utilisation is improved. When introducing for example nitrogen (150 mbar, 40 Nl/h) through a gassing stirrer, after one hour a degree of utilisation of ca. 99% is achieved, and after 5 to 10 hours a degree of utilisation of 99.8% is achieved.

The de-capping by producing inert gas bubbles in the oligocarbonate diol is carried out at temperatures of 130° C. to 300° C., preferably at temperatures of 200° C. to 240° C., and at pressures of 0.01 to 1000 mbar, preferably at pressures of 30 to 400 mbar, particularly preferably at pressures of 70 to 200 mbar.

The molecular weight of the oligocarbonate diols produced by the process according to the invention is adjusted via the molar ratio of diol to DMC, the molar ratio of diol to DMC being between 1.01 and 2.0, preferably between 1.02 and 1.8, and particularly preferably between 1.05 and 1.6. The specified ratio describes of course the stoichiometry of the product, i.e. the effective ratio of diol to DMC after distilling off the DMC-methanol mixtures. The amounts of DMC that are used in each case are correspondingly higher due to the azeotropic distillation of the DMC. The calculated molecular weights of the oligocarbonate diols produced by the process according to the invention are then, for example in the case of 1,6-hexanediol as diol component, between 260 and 15000 g/mole, preferably between 300 and 7300 g/mole, particularly preferably between 350 and 3000 g/mole. If a diol of heavier or lighter molecular weight is used, then the molecular weights of the oligocarbonate diols produced according to the invention are correspondingly higher or lower.

The process according to the invention enables oligocarbonate diols of the formula II to be produced having between 7 and 1300, preferably between 9 and 600 and particularly preferably between 11 and 300 carbon atoms in the chain, in which R1 is used as a symbol for aliphatic diols with between 3 and 50, preferably between 4 and 40, and particularly preferably between 4 and 20 carbon atoms in the chain.

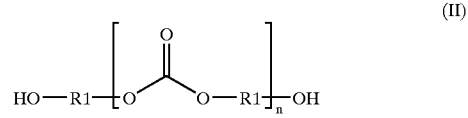

(II)

The diols may additionally contain ester, ether, amide and/or nitrile groups. Preferred are diols or diols with ester groups, such as are obtained for example by the use of caprolactone and 1,6-hexanediol. If two or more diol components are used (for example mixtures of various diols or mixtures of diols with lactones), then two adjacent groups R1 in a molecule may be completely different from one another (statistical distribution).

The process according to the invention permits the reproducible production of high-grade oligocarbonate diols from DMC with good space-time yields under high conversion rates of the DMC.

The oligocarbonate diols produced by the process according to the invention may be used for example to produce plastics materials, fibres, coatings, lacquers and adhesives, for example by reaction with isocyanates, epoxides, (cyclic) esters, acids or acid anhydrides. They may also be used as binders, binder constituents and/or reactive diluents in polyurethane coatings. They are suitable as structural elements for moisture-hardening coatings, and as binders or binder constituents in solvent-containing or aqueous polyurethane coatings. They may furthermore be employed as structural elements for polyurethane prepolymers containing free NCO groups, or in polyurethane dispersions.

The oligocarbonate diols produced by the process according to the invention may also be used to produce thermoplastics materials such as aliphatic and/or aromatic polycarbonates, thermoplastic polyurethanes, etc.

EXAMPLE 1

Normal Pressure Apparatus

The normal pressure experiments were carried out in a 6 liter double-walled, cylindrical, oil-heatable flat-flange pot with floor discharge. The reaction pot is provided with a steel gassing stirrer passing through a flat-flange cover. The gassing stirrer may either aspirate the gas phase in the reaction space and re-pump it, or may feed only fresh nitrogen from outside into the reaction solution. Expelled gas is then removed from the reactor and is not re-pumped. The reaction pot is rendered inert with nitrogen during the whole reaction time. The DMC addition (or addition of DMC-MeOH mixtures) is effected by a Telab pump through a dipping tube passing through the flat-flange cover.

Either a 22 cm Vigreux column or a 90 cm packed column filled with Raschig rings (glass, 4×4 mm) is mounted on the flat-flange cover, followed by a Claisen bridge with collecting flask, gas wash flask and cold trap, or alternatively for vacuum treatment a Claisen bridge, gas wash flask, 3 cold traps in series and a rotary-gate valve pump with which a vacuum of 15 mbar can be produced are mounted directly on the flat-flange cover.

The DMC contents of the distillates were determined by analytical gas chromatography. All percentage figures are percentages by weight.

The degree of utilisation of the terminal OH groups was determined by measuring the methanol present as ester: after complete saponification of the respective oligo-carbonate diol the methanol content was determined by analytical gas chromatography (Headspace). The difference with respect to the methanol content before the saponification represents the methanol content bound as ester.

EXAMPLE 2

Production of an Oligocarbonate Ester Diol With Multiple Replenishment of DMC

The aim is to produce an oligocarbonate ester diol from hexanediol-1,6 and ε-caprolactone with a predetermined ratio of diol to carbonate of 8:7.

The apparatus is described in Example 1. 1890.84 g of hexanediol-1,6 (16 moles), 1826.33 g of α-caprolactone (16 moles) and 0.37 g of titanium tetraisopropylate (17 ppm Ti referred to the diol components) are weighed out into the reaction pot. The diol components are melted, homogenised and heated under nitrogen at 160° C. A total of 1261.12 g of DMC (14 moles) are required for the conversion, and are added in a two-stage procedure.

In the $1^{st}$ stage a mixture of 281.3 g of DMC and 600.3 g MeOH (881.6 g of solution with 31.91% DMC) which was azeotropically distilled off in a previous reaction batch is used. This mixture is added within 24.5 hours at 160° C. and under normal pressure. 677.65 g of a mixture of DMC/MeOH containing 7.83% DMC (53.03 g DMC) are distilled off via the short 22 cm Vigreux column.

In the $2^{nd}$ stage 980.07 of DMC are metered in within 8 hours. 825.5 g of a DMC-MeOH mixture containing 35.29% DMC (291.36 g DMC) are distilled off via the 90 cm long packed column.

344.39 g of DMC that were missing according to the desired stoichiometry had accordingly been distilled off in the two stages. A total of 408.0 g of DMC was therefore subsequently added within 3.5 hours at 160° C. After completion of the addition the batch was heated to 200° C. in order to complete the reaction. A mixture of 175.20 g of DMC/MeOH that contained 32.91% DMC (57.66 g DMC) was distilled off via the large column. Altogether a further 10.0 g of DMC were added at 200° C. within 8 minutes. 6.9 g of DMC/MeOH mixture containing 31.02% DMC (2.14 g DMC) were distilled off. A total of 13.81 g too much DMC were accordingly metered in.

In order to expel the last methanol residues and to utilise the terminal OH groups, 1 l/h of nitrogen was first of all passed into the reaction solution through the gassing stirrer, which was operating at 480 revs/min., followed by 2 l/h $N_2$ for 4 hours and then 40 l/h $N_2$ for 5 hours. A total of 277.3 g of a DMC/MeOH mixture containing 12.6% DMC (35.09 g DMC) were distilled off. 21.28 g of DMC were accordingly missing according to the predetermined stoichiometry.

A clear, slightly yellowish product with a degree of utilisation of the terminal OH groups of 99.1% was obtained.

EXAMPLE 3

Production of an Oligocarbonate Ester Diol by Single Addition of DMC

The aim is again to produce an oligocarbonate ester diol from hexanediol-1,6 and ε-caprolactone, in which the complete amount of DMC is to be added in the $2^{nd}$ stage. The specified stoichiometry is again determined by the diol-carbonate ratio of 1.143, which leads to a product having a calculated average molecular weight of 2040 g/mole and an OH number of 55.

The apparatus is described in Example 1. The stirrer speed was increased to 1500 $min^{-1}$. 1890.84 g of hexanediol-1,6 (16 moles), 1826.33 g of ε-caprolactone (16 moles) and 0.37 g of titanium tetraisopropylate (17 ppm Ti referred to the diol components) were weighed out into the reaction pot. The diol components were melted, homogenised and heated under nitrogen at 160° C. A total of 1261.12 g of DMC (14 moles) were required for the conversion, and were added in a two-stage procedure.

A mixture of 281.3 g of DMC and 600.3 g of MeOH (881.6 g of solution containing 31.9% DMC) was used in the first stage. This mixture was added over 24.75 hours at 160° C. and under normal pressure. 558.02 g of a mixture of DMC/MeOH containing 6.43% DMC (35.89 g DMC) were distilled off via the short 22 cm Vigreux column.

1380.07 g of DMC were metered in within 13 hours in the second stage. The temperature of the reactor was then raised to 200° C. and distillation was continued for a further 2 hours. 1007.00 g of a DMC/MeOH mixture containing 32.21% DMC (324.39 g DMC) were distilled off via the long 90 cm packed column.

A total of 1661.37 g of DMC were metered in in the two stages. 360.28 g were distilled off, which means that an excess of 39.97 g of DMC is still present.

In order to utilise the terminal OH groups 1 l/hour of nitrogen was first of all passed into the reaction solution through the gassing stirrer for 2 hours at 200° C. and 150 mbar, followed by 2 l/hour of $N_2$ for 4 hours and then 40 l/hour of $N_2$ for 7 hours. A total of 228.1 g of a DMC-methanol mixture containing 10.19% DMC (23.25 g DMC) were thereby distilled off. A total of 16.72 g too much DMC had accordingly been added.

Part of the product (1391 g) was removed via the floor discharge valve and investigated. As expected, due to the excess of DMC a product is obtained having too high a viscosity and too low an OH number (37). The degree of utilisation of the terminal OH groups was ca. 99.9%.

EXAMPLE 4

Production of an Oligocarbonate Ester Diol of Predetermined Stoichiometry by Using an Excess of DMC and Effecting Correction by Addition of the Diol Component The product from Example 3 was adjusted to the desired stoichiometry by adding further diol components. Since part of the product (ca. 38%) had already been removed, the excess of DMC in the remainder was calculated to be 10.34 g. In order to convert this excess, a further 15.5 g of adipol and 15.0 g of ε-caprolactone were therefore added stoichiometrically. The reaction solution was then stirred for 5 hours at 160° C. under a nitrogen atmosphere. After cooling the reaction mixture a clear, almost colourless product was obtained (2574 g) having the following characteristics: OH number: 54, degree of utilisation of the terminal OH groups: 99.8%.

EXAMPLES 5–7

Reduction of the DMC Content in the Distilled off Methanol by a Three-Stage Procedure 630.28 g of hexanediol-1,6 (5.33 mole), 608.78 g of ε-caprolactone (5.33 mole) and 0.12 g of titanium tetraisopropylate (17 ppm Ti referred to the diol components) were weighed out into the apparatus described in Example 1, melted, homogenised and heated at 160° C. under nitrogen. 183 g of a DMC-methanol mixture containing 4.92% DMC (9.0 g DMC) were added within 4 hours. A DMC-methanol mixture containing 3.0% DMC was distilled off.

In a second experiment the 4.92% DMC-methanol mixture was added within 8 hours. A DMC-methanol mixture containing 2.60% DMC was distilled off. In a third experiment the mixture was added within 12 hours, a DMC-methanol mixture containing 1.50% DMC being obtained as distillate.

The DMC content could accordingly be reduced to 1.5% to 3% in the first stage of a three-stage process by using the ca. 5% DMC-methanol mixture that is distilled off in the second stage of a three-stage process.

EXAMPLE 8

Production of an Oligocarbonate Diol by Repeated Repumping of the Distillate 1890.84 g of 1,6-hexanediol (16 moles) and 0.18 g of titanium tetra-isopropylate (17 ppm Ti) were placed in the apparatus described in Example 1 and melted. 881.6 g of a DMC-methanol mixture containing 31.9% DMC (281.3 g DMC) was to be added at 160° C. within 25 hours in the first stage, by repumping 12 times: the total DMC-methanol mixture was added thereto within 2 hours. A distillate was obtained that still contained 27.5% DMC. This distillate was then recycled within 2 hours and again provided a DMC-depleted distillate (23.7%). This procedure was repeated a further 10 times. At each stage the DMC of the distillate was depleted still further (see Table 1). After the twelfth repumping a DMC content of 5.9% was finally reached. The second stage of the process (addition of DMC) was no longer carried out.

TABLE 1

DMC contents in the distillate under repeated repumping

| Distillate No. | DMC Content (%) | Distillate Amount [g] | Pump [ml/h] | Time [h] |
|---|---|---|---|---|
| 1 | 27.54 | 788.7 | 515 | 2:15 |
| 2 | 23.65 | 772.8 | 515 | 4:20 |
| 3 | 20.30 | 761.0 | 515 | 6:24 |
| 4 | 17.17 | 774.1 | 515 | 8:53 |
| 5 | 14.55 | 750.9 | 515 | 10:56 |
| 6 | 12.65 | 748.9 | 515 | 12:54 |
| 7 | 10.99 | 744.9 | 515 | 14:58 |
| 8 | 9.59 | 740.0 | 515 | 17:10 |
| 9 | 8.32 | 723.3 | 515 | 19:02 |
| 10 | 7.36 | 729.1 | 515 | 21:12 |
| 11 | 6.54 | 717.8 | 515 | 23:17 |
| 12 | 5.85 | 713.8 | 515 | 25:11 |

For purposes of comparison the experiment was repeated with a catalyst concentration of 250 ppm Ti (0.025% Ti, corresponding to 2.84 g of titanium tetraisopropylate). After the first addition of the DMC-methanol mixture containing 31.9% DMC at the same pumping rate, a distillate containing 12.2% DMC was obtained after ca. 2 hours, which was re-used. Table 2 shows the DMC contents of the distillates. Already after 3 recycles the DMC concentration had fallen to 3.5%, and after 4 recycles (after ca. 6 hours) had fallen to 2.6%.

TABLE 2

DMC contents in the distillate with repeated repumping

| Distillate No. | DMC Content (%) | Distillate Amount [g] | Pump [ml/h] | Time [h] |
|---|---|---|---|---|
| 1 | 12.16 | 442.2 | 515 | 2:09 |
| 2 | 5.83 | 398.1 | 515 | 3:37 |
| 3 | 3.51 | 424.9 | 515 | 4:42 |
| 4 | 2.62 | 414.7 | 515 | 5:56 |
| 5 | 2.65 | 412.0 | 515 | 7:01 |
| 6 | 2.42 | 383.5 | 515 | 8:08 |
| 7 | 2.41 | 383.7 | 515 | 9:15 |
| 8 | 2.39 | 395.6 | 515 | 10:24 |
| 9 | 2.35 | 396.6 | 515 | 11:33 |

EXAMPLE 9

Production of an Oligocarbonate Ester Diol Based on 1,5-Pentanediol 1666.40 g of pentanediol-1,5 (16 moles), 1826.33 g of α-caprolactone (16 moles) and 0.37 g of Ti isopropylate (17 ppm Ti referred to the diol components) were added to the apparatus described in Example 1. The diol components were melted, homogenized and heated at 160° C. under nitrogen. A total of 1261.12 g of DMC (14 moles) required for the reaction, and were added in a two-stage procedure.

A mixture of 281.3 g DMC and 600.3 g MeOH (881.6 g of solution containing 31.91% DMC) was used in the first stage. This mixture was added within 24.5 hours at 160° C. and under normal pressure. 688.18 g of a mixture of DMC/MeOH containing 6.34% DMC (43.65 g DMC) was distilled off via the short 22 cm Vigreux column.

In the second stage 1330.07 g of DMC were metered in within 6.5 hours. The temperature of the reactor was then raised to 200° C. and distillation was continued for a further 2 hours. 1975.84 g of a DMC/MeOH mixture containing 33.92% DMC (331.04 g DMC) were distilled off via the long 90 cm packed column.

Since there was therefore a total deficit of 24.44 g of DMC relative to the specified stoichiometry, a further 60.0 g of DMC were added at 200° C. 34.6 g of a DMC-methanol mixture containing 27.84% DMC (9.63 g DMC) were distilled off.

In order to utilise the terminal OH groups 1 l/h of nitrogen was first of all passed into the reaction solution through the gassing stirrer for 2 hours at 200° C. and 150 mbar, followed by 2 l/h of $N_2$ for 4 hours and then 40 l/h of $N_2$ for 5 hours. A total of 208.2 g of a DMC-methanol mixture containing 9.66% DMC (20.12 g DMC) were distilled off A total of 5.81 g too much DMC had accordingly been added.

4086.8 g of a slightly pale yellow product having an OH number 62 were obtained. The degree of utilisation of the terminal OH groups was 99.9%.

EXAMPLE 10

Pressure Apparatus

The pressure experiments were carried out in a 2 l capacity autoclave that was equipped with an electric stirrer and a dipping tube for adding the DMC. Nitrogen may be passed into the reaction solution through the dipping tube either to provide an inert atmosphere above the reaction solution, or for the de-capping of the terminal groups. The gas mixture distilled off is separated via two packed columns (25 cm and 80 cm long respectively) that can be operated appropriately as desired and that can be heated up to 90° C. via a water thermostat, and is condensed in a reflux cooler. The product is discharged from the apparatus via a pressure retention valve. The pressure in the apparatus is increased through the nitrogen that is fed in: the nitrogen to be fed in is adjusted (minimum 2 l/hour) via a mass flow regulator, and the pressure retention valve is automatically controlled via a pressure measurement device in the apparatus so that only the amount of nitrogen required to maintain the pressure constant is expended. Distillate that is formed is discharged together with the nitrogen.

EXAMPLE 11

Production of an Oligocarbonate Ester Diol Under Pressure

An oligocarbonate ester diol is to be produced from hexanediol and ε-caprolactone with a predetermined ratio of diol to carbonate of 8:7.

630.28 g of hexanediol-1,6 (5.33 moles), 608.78 g of ε-caprolactone (5.33 moles) and 0.123 g of Ti isopropylate (17 ppm Ti referred to the diol components) were weighed out into the apparatus described in Example 10. The autoclave was pressurised (2 bar) with 3 l/h of nitrogen. The diol components were melted, homogenised and heated to 180° C. A total of 420.36 g of DMC (4.67 moles) were required for the reaction, and were added in a two-stage procedure.

A mixture of 39.40 g of DMC and 179.0 g of MeOH (218.4 g of solution containing 18.04% DMC) was used in the first stage. This mixture was metered in within 10 hours at 2 bar and at an internal temperature of 180° C. 96.1 g of a mixture of DMC/MeOH containing 3.64% DMC (3.50 g DMC) was distilled off via the small column (25 cm, 80° C.).

Low DMC contents in the distillate were thus achieved in a significantly shorter time than in the experiments carried out under normal pressure.

In the second stage 437.20 g of DMC were metered in within 7 hours at 180° C. The DMC-methanol azeotrope was distilled off via the large column (80 cm, 80° C.).

After adding the DMC the reactor temperature was raised to 200° C., the column temperature to 85° C., and the mixture was distilled for a further 3 hours. A further 20 g of DMC were added and the whole was distilled for 2 hours. A total of 337.40 g of a DMC-methanol mixture was distilled off, which contained 19.62% DMC (66.21 g DMC).

The utilisation of the terminal groups was effected by passing in 25 l/h of nitrogen through the simple dipping tube at 70 mbar within a period of 40 hours. 54.50 g of a DMC-methanol mixture containing 11.97% DMC (6.52 g) were distilled off.

A product was obtained having an OH number of 80 and a degree of utilisation of the terminal groups of 99.8%.

EXAMPLE 12

Production of an Oligocarbonate Diol Under Pressure

An oligocarbonate diol was to be prepared from hexanediol with a predetermined ratio of diol to carbonate of 1.294.

822.9 g of hexanediol-1,6 (6.96 moles) and 82 mg of Ti isopropylate (17 ppm Ti referred to the diol components) were weighed out into the apparatus described in Example 10. The autoclave was pressurised (2 bar) with 3 l/h of nitrogen. The diol components were melted, homogenised and heated to 184° C. A total of 484.9 g of DMC (5.38 moles) was required for the reaction, and was added in a two-stage procedure.

In the first stage 264.45 g of a DMC-methanol mixture containing 18.04% DMC (47.7 g DMC) were metered in within 10 hours at 2 bar and at an internal temperature of 184° C. 165.3 g of a mixture of DMC/MeOH containing 5.35% DMC (8.85 g DMC) were distilled off via the small column (25 cm), which was heated to 80° C.

In the second stage 515.2 g of DMC were metered in within 6.7 hours at 184° C., followed by 15 g of DMC within 10 minutes at 198° C. The DMC-methanol azeotrope was distilled off via the large column (80 cm, 80° C.). A total of 402.10 g of a DMC-methanol mixture containing 17.90% DMC (71.99 g DMC) were distilled off.

The utilisation of the terminal groups was effected by passing in 5 l/h of nitrogen through the simple dipping tube at 70 mbar and 200° C. within a period of 26 hours. 30.90 g of a DMC-methanol mixture containing 5.73% DMC (1.77 g DMC) were distilled off.

A product was obtained having an OH number of 255, a melting point of 38° C. and a degree of utilisation of the terminal groups of 99.8%.

EXAMPLE 13

Varying the Catalyst Concentration

The experiment of Example 3 was repeated, halving the catalyst concentration (0.186 g of titanium tetraisopropylate, 8 ppm Ti). On adding the DMC-methanol mixture (881.6 g, 31.91% DMC) within 24 hours at 160° C. a DMC-depleted mixture containing ca. 10.2% DMC was obtained in the first stage of the process according to the invention.

The experiment was repeated at 185° C. On adding the DMC-methanol mixture (31.91% DMC) a distillate containing 8.0% DMC was obtained in the first stage within 24 hours.

At 195° C. a distillate containing 6.7% DMC was obtained on adding the DMC-methanol mixture (31.91% DMC).

EXAMPLE 14

Production of an Oligocarbonate Ester Diol Under Pressure

The aim is to produce an oligocarbonate ester diol from hexanediol-1,6 and ε-caprolactone on an industrial scale. The predetermined stoichiometry is determined by the diol-carbonate ratio of 1.143, which leads to a product having a calculated, average molecular weight of ca. 2040 g/mole and an OH number of 55.

A 200 l capacity vessel equipped with a blade stirrer was provided with a 2.5 m long packed column (Ø11 cm, filled with baffles), attached cooler and a 100 l receiver. Distillates collected in the receiver can be recycled to the reactor via an immersed pump through a floor flange.

62.353 kg of adipol (0.528 kmole), 60.226 kg of caprolactone (0.528 kmole) and 12 g of titanium tetraisopropylate (17 ppm Ti) were placed in the reactor, rendered inert under nitrogen, heated to 80° C. and homogenised. 41.612 kg of DMC (0.462 kmole) are accordingly required to achieve the predetermined stoichiometry.

44 kg of the DMC-methanol mixture from the previous batch (23.0% DMC, 10.1 kg DMC) were added to the receiver. The pressure in the apparatus was adjusted to 5.2 bar and the contents were then heated further to 194° C.

The DMC-methanol mixture from the receiver was metered in underneath the liquid level into the stirred vessel within one hour (pumping rate ca. 40 l/h). Distillate formed during the metering in was recycled directly to the receiver, where it was mixed with the original DMC-methanol mixture from the previous batch. This mixture was recycled for a further three hours. DMC-methanol mixture was thus continuously metered into the reactor, a DMC-depleted mixture being distilled off and collected in the same collection vessel, with the result that the DMC concentration fell over time. After a total of 4 hours the metering in was stopped and the reaction mixture was distilled for a further 2 hours.

This distillate was then collected in the receiver and discarded. A DMC-methanol mixture (42.0 kg) containing 5.3% DMC (2.2 kg) was obtained.

47.0 kg of DMC were then added to the receiver. The DMC was added at 196° C. within one hour to the vessel and then—as previously described—recycled by pumping for five hours. The distillate was then collected within 2 hours at 200° C. 51.1 kg of a DMC-methanol mixture containing 25.3% DMC (12.9 kg DMC) were collected.

The pressure in the apparatus was then reduced to normal pressure, following which the pressure was slowly reduced to 100 mbar and the methanol residues were distilled off over 32 hours in order to de-cap the terminal groups.

After discarding the first runnings and remaining residues in the reactor, 116 kg of a clear, pale yellowish product were obtained. The OH number was 58. A correction by adding further amounts of the diol was not performed. The degree of utilisation of the terminal OH groups was 99.6%.
Detailed Analysis of DE-A 198 29 593

According to DE-A 198 29 593 a diol component is placed in the reactor and an oligocarbonate diol is obtained by adding DMC and distilling off methanol. The reaction time is ca. 4 hours (Examples 1 and 2). Molar ratios of methanol to DMC of 0.5:1 to 99:1 in the distillate (claim 1c) are achived. This corresponds to DMC contents of 85 to 2.8 wt. %.

DE-A 198 29 593 does not disclose that the amount of DMC used is reduced by azeotropically distilled-off DMC and therefore no longer agrees with the predetermined stoichiometry and accordingly has to be corrected.

The fact that considerable amounts of DMC are distilled off and have to be replenished can be deduced from the examples:

Thus, in Example 1 an oligocarbonate diol is produced from 918 kg (3920 moles, mol. wt. =234.2 g/mole) of a diol (polyTHF) and 440 kg of DMC (4885 mole, 90.1 g/mole). The carbonate is in this case added in a molar excess. On account of the reversed ratio of diol to DMC an oligomer should therefore be produced whose terminal groups should consist of methoxycarbonyl terminal groups as described in formula III, where R1 denotes —(CH$_2$)$_4$—.

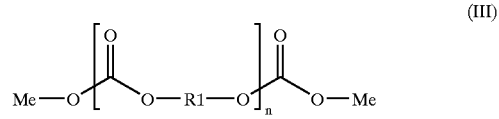

(III)

An oligocarbonate diol with terminal OH groups, as was obtained as end product, can accordingly only be produced if, during the distillation of the methanol, so much DMC has been lost that the quantitative ratios of DMC and diol have reversed once more, i.e. that effectively more diol than DMC has been used. An amount of at least 965 moles (4885–3920) DMC (87 kg) must therefore have been distilled off. This corresponds to ca. 20% of the DMC that was used. After distilling off this amount only the gel point is reached however, which should lead to a complete polymerisation. In order to obtain the oligocarbonate diol that was formed, even larger amounts must therefore have been distilled off.

The effective quantitative ratios can be calculated from the determined OH number of the diol that was formed: according to formula IV, in which n denotes the OH functionality of the oligomer (in this case n=2), the average molecular weight can be determined from the OH number.

molecular weight=(56106·$n$)/OH No. (IV)

From the OH number of the oligocarbonate diol that was formed, namely 44 Mg$_{(KOH)}$/g$_{(diol)}$, an average molecular weight of 2550.25 g/mole can be calculated, corresponding to an average composition of 9.9 diol units and 8.9 carbonate units per molecule. 3920 moles of diol have therefore reacted with only 3524 moles of DMC (=3920×8.9/9.9). Consequently 1361 moles (4885-3524) of DMC have been azeotropically distilled off. This DMC loss therefore accounts for, on average, ca. 27.8% of the DMC used. The distillate consequently consisted of 1361 moles of unreacted DMC (122.5 kg) and 2×3524 moles of MeOH (225.5 kg/two molecules of methanol are formed per molecule of DMC). This leads to a DMC content of ca. 35 wt. % in the distillate.

The necessary correction amounts had therefore already been taken into account in the weighing out, contrary to what had been stated. The DMC-methanol mixture was by and large distilled off as an azeotrope.

Claim 1b also points to the azeotrope problem: a 5-fold excess of DMC, as is disclosed in claim 1b, can be explained only by the need for correction amounts: already starting with a 2-fold excess, in fact only the 2:1 ester is formed, as shown in formula V, where R1 denotes —(CH$_2$)$_4$—.

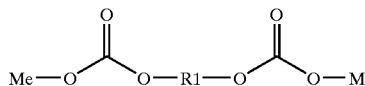

(V)

At a ratio of 1:1 even the gel point is reached, in which a complete polymerisation takes place if the DMC amount has not been reduced by azeotropic distillation.

It must therefore be assumed that in DE-A 198 29 593 azeotropic DMC-methanol mixtures are distilled off, and that the amount of DMC distilled off was already taken into account in the weighing out procedure.

COMPARISON EXAMPLE 1

One-Stage Addition of DMC

In DE-A 198 29 593 the reaction of DMC with a diol is carried out in a one-stage process with reaction times of 4 hours at 140 to 200° C. and at a catalyst concentration of 0.15% or 0.12% Ti(O-nBu)$_4$ (Examples 1 and 2). This corresponds to concentrations of 211 and 170 ppm respectively of Ti. At these high catalyst concentrations the catalyst must be neutralised by adding phosphoric acid after the end of the reaction.

For purposes of comparison with DE-A 198 29 593 the one-stage variant was investigated, in which the total amount of carbonate required is added in one stage as DMC. A DMC-methanol mixture is distilled off during the whole course of the experiment. In each case distillation was performed only via a short Vigreux column in order to exclude column effects (change in the composition due to rectification). The azeotropic composition (ca. 30% at normal pressure) is in fact obtained in each case at the end of a large packed column.

1890.84 g of hexanediol-1,6 (16 moles) and 0.18 g of Ti isopropylate (0.01% Ti(O-iPr)$_4$, i.e. 17 ppm Ti referred to the diol component) were weighed out into the apparatus described in Example 1, melted under a nitrogen atmosphere, homogenised and heated to 160° C. To carry out the reaction 1261.12 g of DMC (14 moles) were metered in within 24 hours under a constant pump output. A DMC-methanol mixture (872.4 g) with a DMC content of 38.1% was distilled off via the short column. The composition fluctuated only slightly over the whole course of the experiment, and the DMC contents of the distillates were always between 37.3% and 40.4%. A total of 332.4 g of DMC were thus azeotropically distilled off, which were added in a subsequent stage within 6.3 hours at the same pump output. A DMC-methanol mixture containing 41.2% DMC was distilled off once more.

The experiment was repeated with the pump outputs halved: the reaction time—the first addition of the total amount of DMC without correction amounts in a subsequent stage—was now 51 hours. A DMC content of 29.8% in the distillate was achieved. A further doubling of the reaction time to 108 hours led to a DMC content of 22.3% in the distillate (see Table 3). With a reaction time of 9 hours a DMC content of ca. 96% in the distillate was obtained.

Further similar experiments were carried out with a 15-fold catalyst concentration—as was employed in DE-A 198 29 593. The results are also shown in Table 3.

TABLE 3

DMC contents in the distillate as a function of the reaction time and amount of catalyst

| | Catalyst Concentration | | |
|---|---|---|---|
| Reaction time (1$^{st}$ stage without subsequent stage) | 0.01% Ti(O-iPr)$_4$ (17 ppm Ti) | 0.15% Ti(O-iPr)$_4$ (250 ppm Ti) | 0.15% Ti(O-nBu)$_4$ (DE-A 198 29 593) |
| 4 hours | | ca. 25.5% | ca. 35% |
| 9 hours | ca. 96% | | |
| 24 hours | ca. 38.1% | ∅ ca. 10.4%*[) ] | |
| 51 hours | ca. 29.8% | | |
| 108 hours | ca. 22.3% | | |

*[)] Increasing DMC content from 5.7% at the start to 18.3% at the end of the experiment The experiment involving a reaction time of 9 hours (catalyst concentration 0.01% Ti(O-iPr)$_4$ i.e. 17 ppm Ti) shows that, under these conditions, the transesterification is the velocity-determining stage: DMC is added so quickly that it is directly distilled off again without reacting (ca. 96%). The distillation rate is significantly greater.

With increasing reaction time and slower metering in of the DMC, the distillation becomes slower and the transesterification itself becomes competitive. The DMC is depleted due to reaction (transesterification), and the DMC fractions in the distillate fall to for example Ca. 22.3% at 108 hours' reaction time.

The experiment involving a reaction time of 9 hours also shows the effect of a large column: without large packed columns the DMC concentrations established at the head of the reactor are obtained. As Examples 2 and 3 show, the DMC is depleted further in a packed column, the azeotrope is then obtained at the head of the column also with short reaction times, and DMC is separated in the column and recycled to the reactor.

The transesterification is greatly accelerated by increasing the catalyst concentration by a factor of 15 (0.15% Ti(O-iPr)$_4$ i.e. 250 ppm Ti), whereas the distillation rate remains constant. At constant reaction times this leads to a preferred reaction of the DMC, with the result that the DMC content in the distillate fall sharply (e.g. from 38% to on average 10.4% at a reaction time of 24 hours, see Table 3). A reduction of the reaction time then leads in turn to a higher DMC content in the distillate (ca. 25.5% at 4 hours' reaction time and 0.15% catalyst) due to acceleration of the distillation, while an increase in the reaction time leads to a higher DMC conversion and thus to lower DMC contents in the distillate.

The experiment with a reaction time of 24 hours and a catalyst concentration of 0.15% Ti(O-iPr)$_4$ i.e. 250 ppm Ti) shows that the DMC content of the distillate rises with increasing reaction time. Table 4 shows this rise in the DMC concentration of the distillate. The amounts of distillate formed per unit time were constant. The average DMC content of all distillates was 10.4%.

TABLE 4

DMC content in the distillate as a function of time at a reaction duration of 24 hours and a catalyst concentration of 0.15% Ti(O-iPr)$_4$

| Time [h] | DMC Contents in Distillate [%] |
|---|---|
| 3:12 | 5.72 |
| 5:00 | 5.70 |
| 7:57 | 6.41 |
| 9:34 | 7.16 |
| 11:31 | 8.06 |
| 14:28 | 9.43 |
| 16:15 | 10.90 |
| 17:49 | 12.30 |
| 20:19 | 14.25 |
| 24:00 | 18.31 |

The distillation rate remains constant during this experiment (equal amounts of distillate per unit time). An increasing DMC content can be explained by the decrease in the rate of reaction of the DMC: pure diol and DMC are present at the start of the experiment, and the transesterification equilibrium is displaced to the maximum extent. The driving force to achieve equilibrium through a chemical reaction is high, and the transesterification is quick. As the reaction proceeds over time the system approaches equilibrium and the driving force to achieve further transesterification decreases. Accordingly the reaction rate of the transesterification slows down in contrast to the constant distillation, and the DMC content in the distillate constantly increases. When this behaviour was not observed or only to a minor extent in the other experiments (increase in the DMC content by ca. 1 percentage point), this reflects the higher DMC content already present at the start (23–30%).

This sharp rise in the DMC content is not observed with a multistage process according to the invention, since in the first stage only ca. ⅓ of the total amount of DMC in the form of the DMC-methanol mixture is available from a previous batch. Accordingly, in this experiment too (see Table 4) a DMC content of only 5% to 6% in the distillate was achieved during the first 8 hours.

Claim 1c of DE-A 198 29 593 discloses a DMC content of the distillate of 85 to 2.8 wt. %. As the Comparison Examples show, a DMC content of ca. 3% should be very easy to achieve: at high catalyst concentrations and long reaction times a DMC content of ca. 5% in the distillate can be achieved without any difficulty at the start of a batch, and with longer reaction times or higher catalyst concentrations even lower DMC contents can be achieved.

These low DMC losses are achieved however only by such a high catalyst concentration that the catalyst has to be neutralised or separated after the end of the reaction, which is a complicated procedure. In addition, the DMC loss due to attainment of the transesterification equilibrium rises with increasing reaction time. Permanently low DMC contents in the distillate can accordingly be achieved at the end of the reaction time only under extremely long reaction times.

If the amount of catalyst is reduced to such an extent that it can be left in the product (less than 0.01% Ti(O-iPr)$_4$ i.e. 17 ppm Ti), then small DMC contents in the distillate cannot feasibly be achieved. Thus, even with a reaction time of more than 100 hours the DMC content can be reduced only to ca. 22%. In order to achieve a further reduction in the DMC content in the distillate at catalyst concentrations that can subsequently be left in the product, a further, no longer practicable increase in the reaction time is necessary.

What is claimed is:

1. A multistage process for the production of aliphatic oligocarbonate diols characterized in a degree of conversion greater than 80% comprising reacting at least one aliphatic diol with dimethyl carbonate (DMC), optionally accelerated by catalysts, wherein the dimethyl carbonate is introduced into the reaction in at least two successive stages and where in at least the first stage of the process dimethyl carbonate is introduced in the form of its mixture with methanol.

2. Process according to claim 1 characterised in that the reaction of DMC and aliphatic diols is carried out in two stages, wherein DMC-methanol mixtures that have been distilled off from a previous batch are used in a first stage with further utilisation of the contained DMC, and pure DMC is used in a second stage, a DMC-methanol mixture being distilled off that is collected and re-used in the first stage in a following batch.

3. Process according to claim 1 characterised in that the reaction of DMC and aliphatic diols is carried out in three stages, wherein the DMC-methanol mixture containing only a small proportion of DMC that has been distilled off from the second stage of a previous batch is used in a first stage, with almost complete utilisation of the contained DMC, and the DMC-methanol mixture that has been distilled off in the third stage of a previous batch is used in a second stage, with utilisation of the contained DMC and distilling-off of a DMC-methanol mixture with a small proportion of DMC, which is collected and used in the first stage in a following batch, and pure DMC is used in a third stage, a DMC-methanol mixture being obtained that is collected and re-used in the second stage in a following batch.

4. Process according to claim 1 characterised in that the total amount of DMC represented by the sum of the partial amounts of DMC used in each case in all stages, less the amounts of DMC that are distilled off during the overall reaction, corresponds to the total amount of DMC that is predetermined by the stoichiometry of the desired product, wherein after the in each case last stage of the process the missing amounts of DMC that have previously been distilled off are additionally added or are additionally used in the in each case last stage in which pure DMC is added.

5. Process according to claim 1 characterised in that an excess of DMC is used, the oligocarbonate diol that is formed is de-capped, and the desired stoichiometry of the oligocarbonate diol is then correctly adjusted by adding the corresponding amounts of the diol components and renewed esterification.

6. Process according to claim 1 characterised in that the molar ratio of diol to DMC in the product predetermined by the stoichiometry of the desired end product is between 1.01 and 2.0.

7. Process according to claim 1 characterised in that the reaction of DMC with aliphatic diols is carried out at pressures between 0.4 and 100 bar, and at temperatures from 100° C. to 300° C.

8. Process according to claim 1 characterised in that it is carried out batchwise or continuously.

9. Process according to claim 1 characterised in that aliphatic diols with 3 to 20 C atoms in the chain, as well as mixtures of various diols, are used.

10. Process according to claim 1 characterised in that addition products of the diols with lactones (ester diols) such as for example caprolactone, valerolactone etc., as well as mixtures of the diols with lactones, are used.

11. Process according to claim 1 characterised in that addition products of the diols with dicarboxylic acids, such as for example adipic acid, glutaric acid, succinic acid, malonic acid etc., or esters of the dicarboxylic acids as well as mixtures of the diols with dicarboxylic acids or esters of the dicarboxylic acids, are used.

12. Process according to claim 1 characterised in that polyether polyols such as for example polyethylene glycol, polypropylene glycol, polybutylene glycol are used.

13. Process according to claim 1 characterised in that hexanediol-1,6 or mixtures of hexanediol-1,6 and caprolactone are used.

14. Process according to claim 10 characterised in that the ester is formed in situ from the starting materials during the oligocarbonate-diol preparation without preliminary transesterification.

15. Process according to claim 1 characterised in that all known soluble catalysts for transesterification reactions (homogeneous catalysis) are used.

16. Process according to claim 1 characterised in that soluble catalysts are used in concentrations up to 1000 ppm (0.1%).

17. Process according to claim 1 characterised in that the catalyst is left in the product, separated, neutralised or masked after the end of the reaction.

18. Process according to claim 1 characterised in that heterogeneous transesterification catalysts are used (heterogeneous catalysis).

19. Process according to claim 1 characterised in that the terminal OH groups are de-capped after the end of the reaction by removing the last residues of methanol by applying a vacuum.

20. Process according to claim 1 characterised in that the de-capping of the OH terminal groups after the end of the reaction (distillation) is effected by expelling the last residues of methanol and completing the transesterification by passing inert gas bubbles into the reaction mixture, optionally under application of a vacuum.

21. Process according to claim 1 characterised in that the methanol containing and dimethyl carbonate-containing/gas stream leaving the oligocarbonate is partially added again to the oligocarbonate for the saturation.

22. Process according to claim 1 characterised in that the de-capping of the terminal OH groups after the end of the reaction (distillation) is carried out by passing inert gases such as nitrogen, argon, methane, ethane, propane, butane, dimethyl ether, dry natural gas or dry hydrogen, etc. into the reactor and generating gas bubbles in the reactor, optionally under the application of a vacuum.

23. Process according to claim 1 characterised in that the de-capping of the terminal OH groups after the end of the reaction (distillation) is effected by passing low boiling point, inert liquids such as pentane, cyclopentane, hexane, cyclohexane, petroleum ether, diethyl ether or methyl tert.-butyl ether, etc. into the reactor and generating gas bubbles in the reactor optionally under the application of a vacuum, wherein the above substances may be introduced in liquid or gaseous form.

24. Process according to claim 19 characterised in that the de-capping is carried out at temperatures of 130° C. to 300° C. and at pressures of 0.01 mbar to 10 bar.

* * * * *